(12) United States Patent
Palmer et al.

(10) Patent No.: US 9,639,804 B1
(45) Date of Patent: May 2, 2017

(54) SYSTEM AND METHOD TO DETERMINE RESPONSIVENESS OF A DRIVER OF A VEHICLE TO FEEDBACK REGARDING DRIVING BEHAVIORS

(71) Applicant: SMARTDRIVE SYSTEMS, INC., San Diego, CA (US)

(72) Inventors: Jason Palmer, Carlsbad, CA (US); Mark Freitas, San Diego, CA (US); Daniel A. Deninger, Carlsbad, CA (US); David Forney, La Jolla, CA (US); Slaven Sljivar, San Diego, CA (US); Alekh Vaidya, San Diego, CA (US); Jeffrey Griswold, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

(21) Appl. No.: 15/077,825

(22) Filed: Mar. 22, 2016

(51) Int. Cl.
| | |
|---|---|
| *G06F 17/00* | (2006.01) |
| *G06F 17/20* | (2006.01) |
| *G06N 5/04* | (2006.01) |
| *B60W 40/09* | (2012.01) |

(52) U.S. Cl.
CPC ............... *G06N 5/04* (2013.01); *B60W 40/09* (2013.01)

(58) Field of Classification Search
USPC .......................................................... 706/11
See application file for complete search history.

(56) References Cited

U.S. PATENT DOCUMENTS

| | | | |
|---|---|---|---|
| 5,499,182 | A | 3/1996 | Ousborne |
| 5,758,299 | A | 5/1998 | Sandborg |
| 6,200,139 | B1 | 3/2001 | Clapper |
| 6,253,129 | B1 | 6/2001 | Jenkins |

(Continued)

OTHER PUBLICATIONS

Examining the impact of driving style on the predictability and responsiveness of the driver: Real-world and simulator analysis Anup Doshi; Mohan M. Trivedi 2010 IEEE Intelligent Vehicles Symposium Year: 2010 pp. 232-237, DOI: 10.1109/IVS.2010. 5547969 IEEE Conference Publications.*

(Continued)

*Primary Examiner* — Michael B Holmes
(74) *Attorney, Agent, or Firm* — Sheppard Mullin Richter & Hampton LLP

(57) ABSTRACT

This disclosure relates to a system and method for determining responsiveness of a driver of a vehicle to feedback regarding driving behaviors. The system may include a sensor configured to generate output signals conveying first driving behavior information, which may characterize operation of the vehicle by the driver. The system may include one or more processors configured to obtain the first driving behavior information. The one or more processors may effectuate provision of feedback defined by feedback information based on the first driving behavior. The sensor may be configured to output signals conveying second driving behavior information, which may characterize operation of the vehicle by the driver during and/or subsequent to the provision of the feedback. The one or more processors may be configured to obtain the second driving behavior information and assess responsiveness of the driver to the feedback based on the second driving behavior information.

20 Claims, 2 Drawing Sheets

(56) References Cited

U.S. PATENT DOCUMENTS

| | | | |
|---|---|---|---|
| 6,366,207 B1 | 4/2002 | Murphy | |
| 6,556,905 B1 | 4/2003 | Mittelsteadt | |
| 6,714,894 B1 | 3/2004 | Tobey | |
| 6,865,457 B1 | 3/2005 | Mittelsteadt | |
| 7,330,537 B2 * | 2/2008 | Frifeldt | H04L 12/58 379/88.13 |
| 7,389,178 B2 | 6/2008 | Raz | |
| 7,561,054 B2 | 7/2009 | Raz | |
| 7,724,880 B2 * | 5/2010 | Forney | H04L 12/5835 379/88.13 |
| 7,769,499 B2 | 8/2010 | McQuade | |
| 7,885,275 B2 * | 2/2011 | Frifeldt | H04L 12/58 370/352 |
| 7,941,258 B1 | 5/2011 | Mittelsteadt | |
| 8,059,793 B2 * | 11/2011 | Shaffer | H04L 12/5835 379/88.13 |
| 8,068,979 B2 | 11/2011 | Breed | |
| 8,170,540 B2 * | 5/2012 | Zeilingold | G06F 8/65 455/418 |
| 8,508,353 B2 | 8/2013 | Cook | |
| 8,559,605 B2 * | 10/2013 | Forney | H04M 3/22 379/88.22 |
| 8,594,653 B2 * | 11/2013 | Zeilingold | G06F 8/65 455/418 |
| 8,849,501 B2 | 9/2014 | Cook | |
| 8,856,288 B2 * | 10/2014 | Mehta | H04L 41/082 709/220 |
| 8,892,310 B1 * | 11/2014 | Palmer | G07C 5/008 701/300 |
| 8,989,959 B2 | 3/2015 | Plante | |
| 9,296,401 B1 * | 3/2016 | Palmer | B61L 15/0072 |
| 9,487,222 B2 * | 11/2016 | Palmer | B61K 9/00 |
| 9,501,878 B2 * | 11/2016 | Palmer | G07C 5/0841 |
| 2002/0091473 A1 | 7/2002 | Gardner | |
| 2002/0120374 A1 | 8/2002 | Douros | |
| 2004/0254698 A1 | 12/2004 | Hubbard | |
| 2005/0131597 A1 | 6/2005 | Raz | |
| 2006/0072792 A1 | 4/2006 | Toda | |
| 2007/0001831 A1 | 1/2007 | Raz | |
| 2007/0027583 A1 | 2/2007 | Tamir | |
| 2007/0257804 A1 | 11/2007 | Gunderson | |
| 2010/0045451 A1 | 2/2010 | Periwal | |
| 2010/0087984 A1 | 4/2010 | Joseph | |
| 2011/0251752 A1 | 10/2011 | DeLarocheliere | |
| 2012/0078063 A1 | 3/2012 | Moore-Ede | |
| 2012/0100509 A1 | 4/2012 | Gunderson | |
| 2014/0226010 A1 | 8/2014 | Molin | |
| 2015/0006064 A1 * | 1/2015 | Dextreit | F02N 11/0822 701/112 |
| 2015/0057836 A1 | 2/2015 | Plante | |
| 2016/0107537 A1 * | 4/2016 | Marchal | B60L 11/1861 429/50 |
| 2016/0224953 A1 * | 8/2016 | McClintic | G06Q 10/20 705/40 |

OTHER PUBLICATIONS

A driver model for velocity tracking with look-ahead Erik Hellström; Mrdjan Jankovic 2015 American Control Conference (ACC) Year: 2015 pp. 3342-3347, DOI: 10.1109/ACC.2015.7171848 IEEE Conference Publications.*

Measuring Neuromuscular Control Dynamics During Car Following With Continuous Haptic Feedback David A. Abbink; Mark Mulder; Frans C. T. Van der Helm; Max Mulder; Erwin R. Boer IEEE Transactions on Systems, Man, and Cybernetics, Part B (Cybernetics) Year: 2011, vol. 41, Issue: 5 pp. 1239-1249, DOI: 10.1109/TSMCB.2011.2120606 IEEE.*

Essential feature extraction of driving behavior using a deep learning method HaiLong Liu; Tadahiro Taniguchi; Yusuke Tanaka; Kazuhito Takenaka; Takashi Bando 2015 IEEE Intelligent Vehicles Symposium (IV) Year: 2015 pp. 1054-1060, DOI: 10.1109/IVS.2015.7225824 IEEE Conference Publications.*

Jessyca Wallace, 'The DriveCam Driver Feedback System', Apr. 6, 2004 (21 pgs.).

Karen, 'Managers Guide to the DriveCam Driving Feedback System', Jul. 30, 2002 (11 pgs.).

* cited by examiner

SYSTEM AND METHOD TO DETERMINE RESPONSIVENESS OF A DRIVER OF A VEHICLE TO FEEDBACK REGARDING DRIVING BEHAVIORS

FIELD

This disclosure relates to a system and method for determining responsiveness of a driver of a vehicle to feedback regarding driving behaviors.

BACKGROUND

Systems configured to record, store, and transmit video, audio, and sensor data associated with a vehicle are known. Vehicle Engine Control Module (ECM) systems are known. Such systems interface with external computers (e.g., at an automobile mechanic) where the data stored by the ECM system is analyzed.

SUMMARY

One aspect of the disclosure relates to a system configured to determine responsiveness of a driver of a vehicle to feedback regarding driving behaviors. Some or all of the system may be installed in the vehicle and/or be otherwise coupled with the vehicle. The system may include one or more processors and/or other components. In some implementations, the one or more processors may be located remotely from the vehicle. In some implementations, the one or more processors may be located on or in the vehicle. In some implementations, the system may include a sensor. The sensor may be configured to generate output signals conveying one or more of first driving behavior information and/or second driving behavior information. The sensor may include one or more of image sensors, audio sensors, temperature sensors, humidity sensors, vehicle speed sensors, wheel speed sensors, proximity sensors, pressure sensors, seat belt sensors, accelerometers, tilt sensors, inclination sensors, angular rate sensors, gyroscopes, geolocation sensors, magnetometers, radar detectors, radar sensors, vibration sensors, light detection sensors, ECM sensors, physiological sensors, tachographs, user input devices, and/or other sensors. In some implementations, the first driving behavior information and the second driving behavior information may include one or more of visual information, audio information, motion information, acceleration information, location information, spatial information, orientation information, tilt information, inclination/declination information, vibration information, time information, vehicle status information, driver status information, and/or other driving behavior information.

The one or more processors may be configured to obtain the first driving behavior information. The first driving behavior information may characterize operation of the vehicle by the driver. The operation of the vehicle may be characterized by one or more of visual information, audio information, motion information, acceleration information, location information, spatial information, orientation information, tilt information, inclination/declination information, vibration information, time information, vehicle status information, driver status information, and/or other driving behavior information.

The one or more processors may be configured to determine an occurrence of a trigger based on the first driving behavior information. The trigger may indicate a specific driving behavior. The specific driving behavior may include one or more of driving maneuver, driving context, vehicle status, driver status, and/or other driving behavior.

The one or more processors may be configured to obtain feedback information regarding the specific driving behavior. The feedback information may define feedback regarding the specific driving behavior to be provided to the driver. Such feedback information may define feedback type(s) for the feedback, information to be provided to the driver in the feedback, and/or other aspects of the feedback. The feedback type(s) may include one or more of visual feedback, audio feedback, haptic feedback, and/or other feedback. The information to be provided to the driver may include one or more of identification of the specific driving behavior, description of the specific driving behavior, the first driving behavior information, instruction regarding the specific driving behavior, warning regarding the specific driving behavior, and/or any other communicable information. The feedback information may be programmed into the one or more processors, updated by the one or more processors, obtained by the one or more processors from electronic storage, obtained by the one or more processors from remote location, and/or obtained by the one or more processors in other ways.

The one or more processors may be configured to effectuate provision of feedback defined by the feedback information to the driver. In some implementations, the one or more processors may be configured to effectuate the provision of the feedback to the driver by operating one or more of a display, a speaker, and/or a haptic generator. In some implementations, the one or more processors may be configured to select one or more of the display, the speaker, and/or the haptic generator to effectuate the provision of the feedback to the driver. The one or more processors may select one or more of the display, the speaker, and/or the haptic generator based on prior driver responsiveness information. The one or more processors may make such selection based on which type of feedback provision leads to better driver responsiveness to feedback.

The one or more processors may be configured to obtain the second driving behavior information. The second driving behavior information may characterize operation of the vehicle by the driver during and/or subsequent to the provision of the feedback. The one or more processors may be configured to assess responsiveness of the driver to the feedback based on the second driving behavior information. In some implementations, the one or more processors may be configured to determine a driver responsiveness rating. The driver responsiveness rating may include one or more measurement and/or evaluation of the driver's responsiveness to the feedback. The driver responsiveness rating may use one or more characters, alphabetic characters, words, numeric characters, numbers, alphanumeric characters, roman numerals, special characters, percentages, colors, and/or other ratings. The driver responsiveness rating may reflect one or more of quality and/or quantity of the driver's responsiveness to the feedback.

In some implementations, the one or more processors may be configured to effectuate storage of driver responsiveness information. The driver responsiveness information may be stored in electronic storage. The electronic storage may include one or more of memory of the one or more processors, electronic storage coupled to the one or more processors, and/or other electronic storage. The driver responsiveness information may include one or more of the first driving behavior information, the second driving behavior information, the feedback information, information relating to the provision of the feedback, information relating to the trigger, information relating to the responsiveness of the driver to the feedback, and/or other driver responsiveness information. In some implementations, the one or more processors may be configured to effectuate retrieval of prior driver responsiveness information. The prior driver responsiveness information may include stored driver responsiveness information.

In some implementations, the one or more processors may be configured to assess the responsiveness of the driver to the feedback based on the prior driver responsiveness information. The one or more processors may compare current responsiveness of the driver to the feedback with prior driver responsiveness information. In some implementations, the current responsiveness and the prior driver responsiveness information are based on the same trigger. In some implementations, the current responsiveness and the prior driver responsiveness information are based on different triggers. In some implementations, the current responsiveness and the prior driver responsiveness information are based on the same type of feedback provision. In some implementations, the current responsiveness and the prior driver responsiveness information are based on different types of feedback provision.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
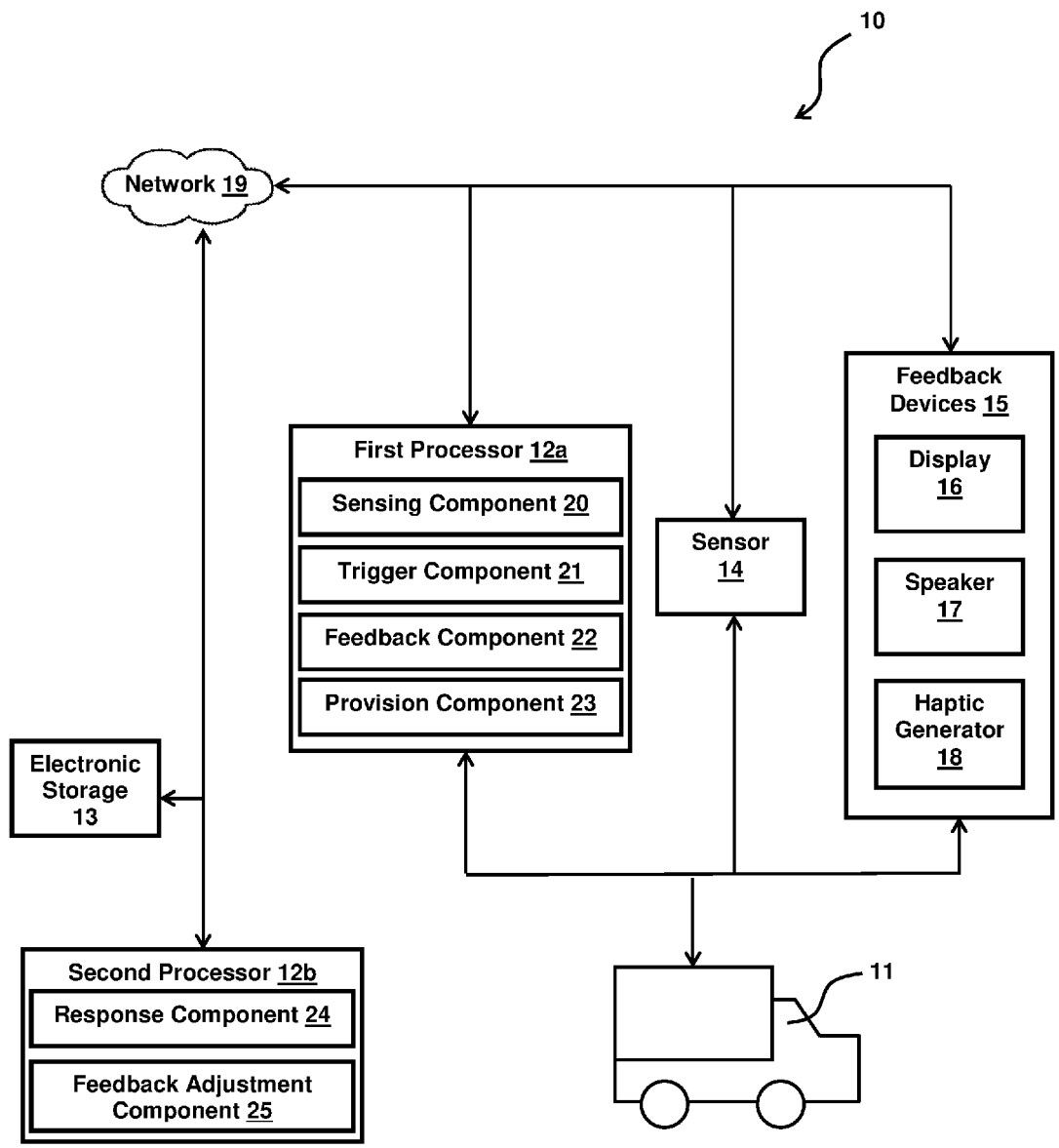
FIG. 1 illustrates a system configured to determine responsiveness of a driver of a vehicle to feedback regarding driving behaviors.

FIG. 1 illustrates a system 10 configured to provide feedback to a driver of vehicle 11 regarding driving behavior while operating vehicle 11. Such feedback may be presented to the driver during the same driving session in which the driving behavior occurred. This may include providing feedback to the driver in real time, near real time, and/or at other times during the driving session. System 10 may be configured to monitor driving behavior during and/or after provision of such feedback. From this monitoring, system 10 may determine responsiveness of a driver of vehicle 11 to feedback regarding driving behaviors. System 10 may include one or more of first processor 12a, second processor 12b, electronic storage 13, sensor 14, feedback devices 15, and/or other components. Feedback devices 15 may include one or more of display 16, speaker 17, haptic generator 18, and/or other feedback devices. Some or all of system 10 may be installed in vehicle 11 and/or be otherwise coupled, directly or indirectly, with vehicle 11. By way of non-limiting example, second processor 12b may be located remotely from vehicle 11, while first processor 12a, sensor 14, display 16, speaker 17, and haptic generator 18 may be located on or in vehicle 11. By way of non-limiting example, second processor 12b may be in a server located remotely from vehicle 11 and may communicate with first processor 12a, sensor 14, display 16, speaker 17, haptic generator 18, and/or other components over network 19. Electronic storage 13 may be located remotely from vehicle 11, or on or in vehicle 11. Electronic storage 13 may be located remotely from first processor 12a and/or second processor 12b.

Electronic storage 13 may comprise electronic storage media that electronically stores information. The electronic storage media of electronic storage 13 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 13 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 13 may store software instructions, driving behavior information, trigger information, feedback information, information relating to the provision of feedback, driver responsiveness information, information determined by first processor 12a, information determined by second processor 12b, and/or other information that enables system 10 to function properly. Electronic storage 13 may be (in whole or in part) a separate component within system 10, or electronic storage 13 may be provided (in whole or in part) integrally with one or more other components of system 10. By way of non-limiting example, electronic storage 13 may include one or more memory of first processor 12a, memory of second processor 12b, electronic storage coupled to first processor 12a, electronic storage coupled to second processor 12b, and/or other electronic storage.

Although electronic storage 13 is shown in FIG. 1 as a single entity, this is for illustrative purposes only. In some implementations, electronic storage 13 may comprise a plurality of storage units. These storage units may be physically located within the same device (e.g., a vehicle event recorder), or electronic storage 13 may represent storage functionality of a plurality of devices operating in coordination.

Sensor 14 may be configured to generate output signals conveying driving behavior information. Sensor 14 may include one or more of image sensors, audio sensors, temperature sensors, humidity sensors, vehicle speed sensors, wheel speed sensors, proximity sensors, pressure sensors, seat belt sensors, accelerometers, tilt sensors, inclination sensors, angular rate sensors, gyroscopes, geolocation sensors, magnetometers, radar detectors, radar sensors, vibration sensors, light detection sensors, ECM sensors, physiological sensors, tachographs, user input devices, and/or other sensors. In some implementations, the driving behavior information may include one or more of visual information, audio information, motion information, acceleration information, location information, spatial information, orientation information, tilt information, inclination/declination information, vibration information, time information, vehicle status information, driver status information, and/or other driving behavior information.

Although sensor 14 is depicted in FIG. 1 as a single element, this is not intended to be limiting. Sensor 14 may include one or more sensors located adjacent to and/or in communication with the various mechanical systems of vehicle 11, in one or more positions (e.g., at or near the front of vehicle 11) to accurately acquire information representing the vehicle environment (e.g. visual information, spatial information, orientation information), and/or in other locations. For example, in some implementations, sensor 14 may include one or more on-board diagnostics sensors of vehicle 11. In some implementations, sensor 14 may include one or more accelerometers to detect sudden acceleration/deceleration of vehicle 11. Other sensors are contemplated One or more feedback devices 15 may be included on or in vehicle 11. The one or more feedback devices 15 may include one or more of display 16, speaker 17, haptic generator 18, and/or other feedback devices. Feedback devices 15 may be configured to provide feedback defined by feedback information to the driver of vehicle 11.

Display 16 may provide feedback to the driver through visual information presented on display 16. Display 16 may be integrated with vehicle 11. By way of non-limiting example, display 16 may include one or more of a dashboard display, a global positioning system (GPS) navigation display, a front view camera display, a rear view camera display, and/or other displays. Display 16 may not be integral with vehicle 11. By way of non-limiting example, display 16 may include one or more of aftermarket display, computer, laptop, tablet, smartphone, and/or other displays.

Speaker 17 may provide feedback through audio information. Speaker 17 may include a speaker in a sound system of vehicle 11. Speaker 17 may not be integral with vehicle 11. Speaker 17 may include a headphone, an earphone, a headset, an earset, and/or other speakers. Speaker 17 may include a speaker associated with display 16.

Haptic generator 18 may provide feedback through haptic information. The haptic information may include vibration, motion, temperature changes, and/or other haptic information. For example, vibration and/or haptic feedback may be short, long, and/or of varying intensity. The intensity of vibration and/or haptic feedback may vary over time. Haptic generator 18 may be located in one or other places inside vehicle 11. By way of non-limiting example, haptic generator 18 may be located in a seat, a headrest, an armrest, a driving wheel, a door, a floor, and/or other locations in the vehicle. Haptic generator 18 may not be integral with vehicle 11. For example, haptic generator 18 may include a device or an object associated with the driver of vehicle 11, such as a computer, laptop, tablet, smartphone, headphone, earphone, headset, earset, headwear, smartwatch, fitness band, wristwear, and/or other device or object.

One or more components of system 10 may communicate with each other through hard-wired communication, wireless communication, or both. For example, second processor 12b may communicate with sensor 14 over a wireless network. Other types of communications are contemplated by the present disclosure. By way of non-limiting example, wireless communication may include one or more of radio communication, Bluetooth communication, Wi-Fi communication, cellular communication, infrared communication, or other wireless communication.

First processor 12a and/or second processor 12b may be configured to provide information processing capabilities in system 10. As such, first processor 12a and/or second processor 12b may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

First processor 12a and/or second processor 12b may be configured to execute one or more computer program components. The computer program components may include one or more of sensing component 20, trigger component 21, feedback component 22, provision component 23, response component 24, feedback adjustment component 25 and/or other components. By way of non-limiting example, first processor 12a may be configured to execute one or more of sensing component 20, trigger component 21, feedback component 22, provision component 23, and/or other components, and second processor 12b may be configured to execute one or more of response component 24, feedback adjustment component 25, and/or other components. The computer program components configured to be executed by first processor 12a and second processor 12b may not be exclusive to one processor. By way of non-limiting example, both first processor 12a and second processor 12b may be configured to execute sensing component 20. First processor 12a and second processor 12b may be configured to execute the same computer program component at the same time or at different times.

Sensing component 20 may be configured to obtain driving behavior information. The driving behavior information may characterize operation of vehicle 11 by the driver. The operation of vehicle 11 may be characterized by one or more of visual information, audio information, motion information, acceleration information, location information, spatial information, orientation information, tilt information, inclination/declination information, vibration information, time information, vehicle status information, driver status information, and/or other driving behavior information. Sensing component 20 may be configured to obtain driving behavior information at different times. Sensing component 20 may be configured to obtain driving behavior information prior to provision of feedback to the driver of vehicle 11, and during and/or subsequent to the provision of the feedback to the driver.

Visual information may include one or more of an image, a video, and/or other visual information. Visual information may include one or more visual information regarding vehicle 11, objects inside vehicle 11, objects outside vehicle 11, amount of light around vehicle 11, and/or other visual information. Audio information may include one or more audio information regarding audio from vehicle 11, audio inside vehicle 11, audio outside vehicle 11, and/or other audio information.

Motion information may include one or more motion information regarding speed of vehicle 11, distance traveled by vehicle 11, and/or movement of vehicle 11, including one or more of moving forward, moving backwards, moving right, moving left, turning left, turning right, and/or other movement, and/or other motion information. Acceleration information may include one or more acceleration information regarding acceleration of vehicle 11, including acceleration and/or deceleration of vehicle 11 in any direction or angle, and/or other acceleration information.

Location information may include one or more location information regarding the location of vehicle 11, including location determined by a GPS, location on or off a road, location inside or outside a structure (e.g., building, parking lot, garage, etc.), and/or other location information. Spatial information may include one or more spatial information regarding the space around vehicle 11, including distance between vehicle 11 and nearby objects (e.g., sign, guard rail, post, person, animal, vehicle, structure, road marking, such as white line, yellow line, stop line, etc.), direction from vehicle 11 to nearby objects, and/or other spatial information. Orientation information may include one or more orientation information regarding vehicle 11 relative to the space around vehicle 11, including the orientation of vehicle 11 relative to nearby objects, and/or other orientation information.

Tilt information may include one or more tilt information regarding left or right sloping position and/or movement of vehicle 11, and/or other tilt information. Inclination/declination information may include one or more inclination/declination information regarding upward or downward sloping position and/or movement of vehicle 11, and/or other inclination/declination information. Vibration information may include one or more vibration information regarding vibration of vehicle 11, one or more components of vehicle 11, and/or haptic generator 18, including the duration and/or intensity of vibration, and/or other vibration information. Time information may include one or more time information regarding the time of day, duration relating to one or more driving behavior information, and/or other time information.

Vehicle status information may include one or more vehicle status information regarding physical features of vehicle 11, mechanical systems of vehicle 11, and/or other vehicle status information. Physical features of vehicle 11 may include physical features of vehicle 11 set during manufacture of vehicle 11, during loading of vehicle 11, and/or at other times. Physical features of vehicle 11 may include vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 11 (e.g., food items, livestock, construction materials, hazardous materials, an oversized load, a liquid), vehicle trailer type, trailer length, trailer weight, trailer height, a number of trailer axles, and/or other physical features.

Mechanical systems of vehicle 11 may include an engine, a drive train, lighting systems (e.g., headlights, brake lights), a braking system, a transmission, fuel delivery systems, and/or other mechanical systems. By way of non-limiting example, vehicle status information regarding mechanical systems of vehicle 11 may include amount of fuel, temperature of engine, temperature inside and/or outside vehicle 11, amount of air pressure inside one or more tires, whether one or more tires are flat, gear in use, whether horn is being used, whether seatbelt is being used, whether one or more doors are open or closed, information from the vehicle ECM system/sensors, whether vehicle 11 is operating (e.g., turned on and/or being driven, etc.), whether vehicle 11 is not operating (e.g., turned off and/or not being driven, etc.), and/or other mechanical systems information.

Driver status information may include one or more driver status information regarding the driver of vehicle 11. By way of non-limiting example, driver status information regarding the driver may include whether the driver is alert, whether driver is sleepy or sleeping, whether driver is using a headphone, whether driver is watching the road, whether the driver is distracted, whether the driver is watching TV, whether the driver is eating, whether the driver is driving with one hand, whether the driver is talking on the phone, the driver's historical accident information, the driver's historical traffic violation information, the driver's historical driving pattern information, and/or other driver status information.

Driver status information may be generated by one or more sensors. By way of non-limiting example, an image sensor may count the number of time vehicle 11 swerves within a certain duration of time to determine whether the driver is sleepy or sleeping. For example, an image sensor may be used to track the driver's eye or head movements and a physiological sensor may be used to track the driver's heart rate to determine whether the driver is sleepy or sleeping. As another example, user input devices (e.g., keyboard, keypad, touchscreen, mouse, etc.) may be used to identify the driver.

Trigger component 21 may be configured to determine an occurrence of a trigger based on the driving behavior information. The trigger may indicate a specific driving behavior. An occurrence of a trigger may be determined as described below, or as described in U.S. Pat. No. 8,892,310, entitled "SYSTEM AND METHOD TO DETECT EXECUTION OF DRIVING MANEUVERS," the foregoing being incorporated herein by reference in its entirety. The specific driving behavior may include one or more of specific driving maneuver, specific driving context, specific vehicle status, specific driver status, and/or other specific driving behavior. In some implementations, one or more triggers may be based on the identity of the driver. For example, a driver may be identified through one or more inputs entered via one or more user input devices. Trigger component 21 may determine an occurrence of a trigger that is specific to the identified driver.

Trigger component 21 may be configured to determine that a trigger has occurred when the driving behavior information indicates occurrence of one or more of a specific driving maneuver, a specific driving context, a specific vehicle status, a specific driver status, and/or other specific driving behavior corresponding to the specific driving behavior. Criteria for occurrence of one or more triggers may be referred to as a trigger logic. The trigger logic may be programmed into trigger component 21, updated by trigger component 21, obtained by trigger component 21 from electronic storage 13, obtained by trigger component 21 from remote location, and/or obtained by trigger component 21 in other ways.

A driving maneuver may refer to one or more motions and/or operations of vehicle 11. The motion of a vehicle may refer to motion of the vehicle at a time, motion of the vehicle over a period of time, motion of the vehicle at a location, and/or motion of the vehicle over a distance. The operation of a vehicle may refer to operation of the vehicle at a time, operation of the vehicle over a period of time, operation of the vehicle at a location, and/or operation of the vehicle over a distance. A specific driving maneuver may be defined by one or more of specific visual information, specific audio information, specific motion information, specific acceleration information, specific location information, specific spatial information, specific orientation information, specific tilt information, specific inclination/declination information, specific vibration information, specific time information, and/or other specific driving behavior information.

By way of non-limiting example, the specific driving maneuver may include swerving, a U-turn, freewheeling, over-revving, lane-departure, short following distance, imminent collision, unsafe turning that approaches rollover and/or vehicle stability limits, hard braking, rapid acceleration, idling, driving outside geo-fence boundary, crossing double-yellow lines, passing on single-lane roads, a certain number of lane changes within a certain amount of time or distance, fast lane change, cutting off other vehicles during lane-change speeding, running a red light, running a stop sign, and/or other driving maneuvers.

A driving context may refer to one or more conditions around and/or inside vehicle 11. The condition around and/or inside a vehicle may refer to one or more permanent and/or transitory state of the environment around and/or inside the vehicle that may impact the driver's ability to operate the vehicle and/or the operation of the vehicle. A specific driving context may be defined by one or more of specific visual information, specific audio information, specific motion information, specific acceleration information, specific location information, specific spatial information, specific orientation information, specific tilt information, specific inclination/declination information, specific vibration information, specific time information, specific vehicle status information, specific driver status information, and/or other specific driving behavior information.

By way of non-limiting example, the specific driving context may include location of vehicle 11 (e.g., on or off different types of road, inside or outside different types of structure, on or of a driving shoulder, on a slope, altitude, etc.), condition around vehicle 11 (e.g., weather, rain, snow, hail, fog, temperature, humidity, lighting condition, visibility, time of day, traffic information, grade of road, road type surface, slippery or icy surface, etc.), proximity and/or orientation to objects near vehicle 11, geofence around vehicle 11, condition inside vehicle 11, passengers or objects inside vehicle 11, lighting condition inside vehicle 11, sound condition inside vehicle 11, and/or other driving context.

A vehicle status may refer to one or more conditions of vehicle 11. The condition of a vehicle may refer to one or more permanent and/or transitory state of the vehicle, including one or more operating state of the vehicle and/or one or more components of the vehicle, that may impact the driver's ability to operate the vehicle and/or the operation of the vehicle. A specific vehicle status may be defined by one or more specific vehicle status information and/or other specific driving behavior information. The specific vehicle status may include specific information regarding one or more of physical features of vehicle 11, including type, size, weight and/or other physical features of vehicle 11, load of vehicle 11, including type, size, weight, loading status, and/or other status of load of vehicle 11, and/or mechanical systems of vehicle 11.

By way of non-limiting example, the specific vehicle status may include specific status of engine, drive train, light system, breaking system, transmission, fuel delivery system, and/or other mechanical systems, amount of fuel, temperature of engine, temperature inside and/or outside vehicle 11, amount of air pressure inside one or more tires, whether one or more tires are flat, gear in use, whether horn is being used, whether seatbelt is being used, whether one or more doors are open or closed, whether vehicle 11 is operating (e.g., turned on and/or being driven, etc.), how long vehicle 11 has been operating, whether vehicle 11 is not operating (e.g., turned off and/or not being driven, etc.), how long vehicle 11 has not been operating, how long vehicle 11 has not been operating when vehicle 11 is operated (e.g., turned on and/or being driven, etc.), and/or other specific vehicle status.

A driver status may refer to one or more conditions of the driver of vehicle 11. The condition of a driver may refer to one or more permanent and/or transitory state of the driver, including one or more physical and/or emotional state of the driver, that may impact the driver's ability to operate the vehicle and/or the operation of the vehicle. A specific driver status may be defined by one or more specific driver status information and/or other specific driving behavior information.

By way of non-limiting example, the specific driver status may include whether the driver is alert, whether driver is sleepy or sleeping, whether driver is using a headphone, whether driver is watching the road, whether the driver is distracted, whether the driver is watching TV, whether the driver is eating, whether the driver is driving with one hand, whether the driver is talking on the phone, and/or other specific driver status.

Feedback component 22 may be configured to obtain feedback information regarding the specific driving behavior. The feedback information may define feedback regarding the specific driving behavior to be provided to the driver. Such feedback information may define feedback type(s) for the feedback, information to be provided to the driver in the feedback, and/or other aspects of the feedback. The feedback type(s) may include one or more of visual feedback, audio feedback, haptic feedback, and/or other feedback.

The information to be provided to the driver may include one or more of identification of the specific driving behavior, description of the specific driving behavior, the driving behavior information, instruction regarding the specific driving behavior, warning regarding the specific driving behavior, and/or any other communicable information. By way of non-limiting example, feedback information may include an identification that a tire of vehicle 11 is low on air pressure, a description regarding off-the-road location of vehicle 11, a visual image of objects behind vehicle 11, an instruction to fill up the gas tank of vehicle 11 at the next stop, a warning that the speed of vehicle 11 is faster than the speeding limit, and/or any other communication.

The feedback information may be programmed into feedback component 22, updated by feedback component 22, obtained by feedback component 22 from electronic storage 13, obtained by feedback component 22 from remote location, and/or obtained by feedback component 22 in other ways. For example, the feedback information may be a voice recording of the driver's supervisor regarding the specific driving behavior that is remotely obtained by feedback component 22.

Provision component 23 may be configured to effectuate provision of feedback defined by the feedback information to the driver of vehicle 11. In some implementations, provision component 23 may be configured to effectuate the provision of the feedback to the driver by operating one or more feedback devices 15, including one or more of display 16, speaker 17, haptic generator 18, and/or other feedback devices. By way of non-limiting example, provision component 23 may effectuate the provision of the feedback by operating display 16 and speaker 17. Display 16 may display the feedback information while speaker 17 audibly communicates the feedback information or produces sound to indicate to the driver that the feedback information is displayed on display 16. In some implementations, provision component 23 may be configured to select one or more of feedback devices 15, including one or more display 16, speaker 17, haptic generator 18, and/or other feedback devices, to effectuate the provision of the feedback to the driver.

Response component 24 may be configured to assess responsiveness of the driver to the feedback based on the driving behavior information obtained during and/or subsequent to the provision of the feedback. Responsiveness of the driver may refer to how the driver acts when feedback is provided to the driver. How a driver acts may refer to any or no changes made by the driver, during and/or subsequent to the provision of the feedback, that may impact the driver's ability to operate the vehicle and/or the operation of the vehicle. Assessing the responsiveness of the driver to the feedback may include measuring the amount of time the driver takes to respond to the feedback, measuring the amount of driving changes the driver makes to the feedback, determining whether the driver ignores the feedback, and/or any other comparison between the driving behavior information obtained prior to the provision of the feedback and the driving behavior information obtained during and/or subsequent to the provision of the feedback. For example, assessing responsiveness of a driver to feedback regarding vehicle 11 being close to a guard rail may include determining how far the driver moves vehicle 11 away from the guard rail and how long it takes for the driver to move vehicle 11 away from the guard rail after the feedback provision.

The operation of vehicle 11 during and/or subsequent to the provision of the feedback may be characterized by different type of information from those relating to one or more of the specific driving maneuver, the specific driving context, the specific vehicle status, the specific driver status, and/or the other specific driving behavior corresponding to the specific driving behavior. By way of non-limiting example, determining whether a driver ignores feedback regarding an open door (for example, as indicated by vehicle status information) may include reviewing visual information inside vehicle 11 during and/or subsequent to the provision of the feedback to confirm that display 16 is providing the feedback information to the driver, and/or reviewing audio information inside vehicle 11 during and/or subsequent to the provision of the feedback to confirm that speaker 17 is providing the feedback information to the driver. If display 16 and/or speaker 17 is not providing the feedback information to the driver, response component 24 may determine that the driver is ignoring the feedback by having turned off or disconnected display 16 and/or speaker 17.

In some implementations, assessing responsiveness of the driver to the feedback may include determining driver responsiveness information. The driver responsiveness information may include one or more of the driving behavior information, the feedback information, information relating to the provision of the feedback, including how and which one or more of feedback devices 15, including one or more of display 16, speaker 17, haptic generator 18, and/or other feedback devices, was operated to effectuate the provision of the feedback, information relating to the trigger, information relating to the responsiveness of the driver to the feedback, and/or other driver responsiveness information.

In some implementations, response component 24 may be configured to determine a driver responsiveness rating. The driver responsiveness rating may include one or more measurement and/or evaluation of the driver's responsiveness to the feedback. The driver responsiveness rating may use one or more characters, alphabetic characters, words, numeric characters, numbers, alphanumeric characters, roman numerals, special characters, percentages, colors, and/or other ratings. The driver responsiveness rating may reflect one or more of quality and/or quantity of the driver's responsiveness to the feedback. For example, a driver responsiveness rating for feedback regarding vehicle 11 being close to a guard rail may include a grade between A-F for how far the driver moves vehicle 11 away from the guard rail and a color to indicate how long it takes for the driver to move vehicle 11 away from the guard rail.

In some implementations, response component 24 may be configured to effectuate storage of the driver responsiveness information. The driver responsiveness information may be stored in electronic storage 13. In some implementations, response component 24 may be configured to effectuate retrieval of prior driver responsiveness information. The prior driver responsiveness information may include driver responsiveness information stored in electronic storage 13.

In some implementations, response component 24 may be configured to assess the responsiveness of the driver to the feedback based on the prior driver responsiveness information. In some implementations, response component 24 may compare current responsiveness of the driver to the feedback with prior driver responsiveness information. By way of non-limiting example, response component 24 may compare current responsiveness of the driver to the feedback with the driver's historical responsiveness reflected in the prior driver responsiveness information. In some implementations, response component 24 may assess responsiveness of the driver to the feedback by taking into account the prior driver responsiveness information.

In some implementations, the current responsiveness and the prior driver responsiveness information are based on the same trigger. In some implementations, the current responsiveness and the prior driver responsiveness information are based on different triggers. In some implementations, the current responsiveness and the prior driver responsiveness information are based on the same type of feedback provision. In some implementations, the current responsiveness and the prior driver responsiveness information are based on different types of feedback provision. For example, response component 24 may assess responsiveness of a driver to feedback regarding vehicle 11 being close to a guard rail by reviewing the driver's prior driver responsiveness to feedback regarding vehicle 11 being close to guard rails. If the prior driver responsiveness information indicates that the driver has repeatedly driven close to guard rails, response component 24 may determine a worse driver responsiveness rating for the driver than if the prior driver responsiveness information indicates that the driver has infrequently driven close to guard rails.

In some implementations, feedback adjustment component 25 may determine feedback type(s) for the feedback. Feedback adjustment component 25 may select one or more of feedback devices 15, including one or more display 16, speaker 17, haptic generator 18, and/or other feedback devices, based on the prior driver responsiveness information. In some implementations, feedback adjustment component 25 may make such selection based on which type of feedback provision leads to better driver responsiveness to feedback. For example, the prior driver responsiveness information may indicate that the driver of vehicle 11 is most responsive to feedback provided through speaker 17 and haptic generator 18, and feedback adjustment component 25 may select speaker 17 and haptic generator 18 to effectuate provision of the feedback. In some implementations, feedback adjustment component 25 may update feedback type(s) in feedback information Although first processor 12a and second processor 12b are shown in FIG. 1 as separate single entities, this is for illustrative purposes only. In some implementations, first processor 12a and/or second processor 12b may comprise a plurality of processing units. These processing units may be physically located within the same device (e.g., a vehicle event recorder), or first processor 12a and/or second processor 12b may represent processing functionality of a plurality of devices operating in coordination.

In some implementations, first processor 12a and second processor 12b may together comprise a single processor. By way of non-limiting example, first processor 12a and second processor 12b may be located in a single processing unit or a plurality of processing units physically located within the same device. By way of non-limiting example, first processor 12a and second processor 12b may be located in a server located remotely from vehicle 11 and may communicate with sensor 14, display 16, speaker 17, haptic generator 18, and/or other components over network 19. By way of non-limiting example, first processor 12a and second processor 12b may be a single processor located in a vehicle event recorder of vehicle 11.

Figure 2:
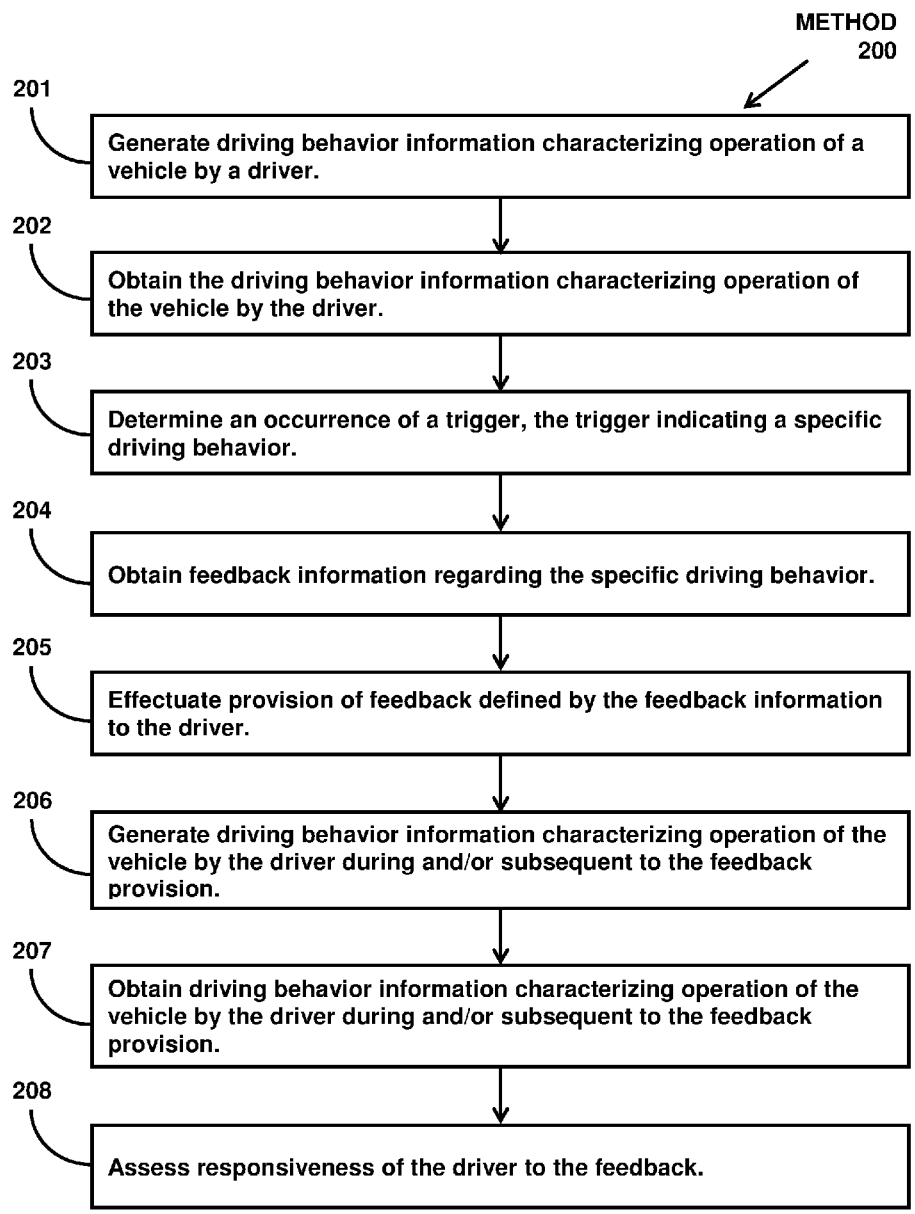
FIG. 2 illustrates a method to determine responsiveness of a driver of a vehicle to feedback regarding driving behaviors.

FIG. 2 illustrates method 200 to determine responsiveness of a driver to feedback regarding driving behaviors. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, driving behavior information characterizing operation of a vehicle by a driver may be generated. The driving behavior information may include one or more of visual information, audio information, motion information, acceleration information, location information, spatial information, orientation information, tilt information, inclination/declination information, vibration information, time information, vehicle status information, driver status information, and/or other driving behavior information. In some implementations, operation 201 may be performed by one or more sensors the same as or similar to sensor 14 (shown in FIG. 1 and described herein).

At operation 202, the driving behavior information characterizing the operation of the vehicle by the driver may be obtained. In some implementations, operation 202 may be performed by a processor component the same as or similar to sensing component 20 (shown in FIG. 1 and described herein).

At operation 203, an occurrence of a trigger, the trigger indicating a specific driving behavior, may be determined. The specific driving behavior may include one or more of specific driving maneuver, specific driving context, specific vehicle status, specific driver status, and/or other specific driving behavior. The occurrence of the trigger may be determined based on occurrence of one or more of the specific driving maneuver, the specific driving context, the specific vehicle status, the specific driver status, and/or the other specific driving behavior. In some implementations, operation 203 may be performed by a processor component the same as or similar to trigger component 21 (shown in FIG. 1 and described herein).

At operation 204, feedback information regarding the specific driving behavior may be obtained. The feedback information may define feedback regarding the specific driving behavior to be provided to the driver. Such feedback information may define feedback type(s) for the feedback, information to be provided to the driver in the feedback, and/or other aspects of the feedback. The feedback type(s) may include one or more of visual feedback, audio feedback, haptic feedback, and/or other feedback. The information to be provided to the driver may include one or more of identification of the specific driving behavior, description of the specific driving behavior, the driving behavior information, instruction regarding the specific driving behavior, warning regarding the specific driving behavior, and/or any other communicable information. In some implementations, operation 204 may be performed by a processor component the same as or similar to feedback component 22 (shown in FIG. 1 and described herein).

At operation 205, provision of feedback defined by the feedback information may be effectuated to the driver. In some implementations, operation 205 may be performed by a processor component the same as or similar to provision component 23 (shown in FIG. 1 and described herein). In some implementations, operation 205 may be performed using one or more of feedback devices 15, including one or more of display 16, speaker 17, haptic generator 18, and/or other feedback devices (shown in FIG. 1 and described herein).

At operation 206, driving behavior information characterizing operation of the vehicle by the driver during and/or subsequent to the feedback provision may be generated. The driving behavior information may include one or more of visual information, audio information, motion information, acceleration information, location information, spatial information, orientation information, tilt information, inclination/declination information, vibration information, time information, vehicle status information, driver status information, and/or other driving behavior information. In some implementations, operation 206 may be performed by one or more sensors the same as or similar to sensor 14 (shown in FIG. 1 and described herein).

At operation 207, the driving behavior information characterizing the operation of the vehicle by the driver during and/or subsequent to the feedback provision may be obtained. In some implementations, operation 207 may be performed by a processor component the same as or similar to sensing component 20 (shown in FIG. 1 and described herein).

At operation 208, responsiveness of the driver to the feedback may be assessed. Assessing the responsiveness of the driver to the feedback may include measuring the amount of time the driver takes to respond to the feedback, measuring the amount of driving changes the driver makes to the feedback, determining whether the driver ignores the feedback, and/or any other comparison between the driving behavior information obtained prior to the provision of the feedback and the driving behavior information obtained during and/or subsequent to the provision of the feedback. In some implementations, operation 208 may be performed by a processor component the same as or similar to response component 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine responsiveness of a driver of a vehicle to feedback regarding driving behaviors, the system comprising:
   one or more processors configured by machine readable instructions to:
      obtain first driving behavior information that characterizes operation of the vehicle by the driver;
      determine an occurrence of a trigger based on the first driving behavior information, the trigger indicating a specific driving behavior;
      obtain feedback information correlating to the specific driving behavior;
      effectuate provision of feedback defined by the feedback information to the driver to prompt the driver to curb the specific driving behavior;
      obtain second driving behavior information that characterizes operation of the vehicle by the driver during and/or subsequent to the provision of the feedback; and
      assess responsiveness of the driver to the feedback based on the second driving behavior information, wherein assessing the responsiveness of the driver includes determining whether the driver curbs the specific driving behavior during and/or subsequent to the provision of the feedback.

2. The system of claim 1, further comprising:
   a sensor configured to generate output signals conveying one or more of the first driving behavior information and/or the second driving behavior information.

3. The system of claim 2, wherein the sensor includes one or more of an image sensor, an audio sensor, a temperature sensor, a humidity sensor, a vehicle speed sensor, a wheel speed sensor, a proximity sensor, a pressure sensor, a seat belt sensor, an accelerometer, a tilt sensor, an inclination sensor, an angular rate sensor, a gyroscope, a geolocation sensor, a magnetometer, a radar detector, a radar sensor, a vibration sensor, a light detection sensor, an ECM sensor, a physiological sensor, a tachograph, and/or a user input device.

4. The system of claim 1, wherein the one or more processors are further configured to effectuate provision of the feedback to the driver by operating one or more of a display, a speaker, and/or a haptic generator.

5. The system of claim 1, wherein the one or more processors are further configured to generate a driver responsiveness rating, the driver responsiveness rating characterizing whether the driver curbs the specific driving behavior during and/or subsequent to the provision of the feedback.

6. The system of claim 1, wherein the first driving behavior information and the second driving behavior information include one or more of visual information, audio information, motion information, acceleration information, location information, spatial information, orientation information, tilt information, inclination/declination information, vibration information, time information, vehicle status information, and/or driver status information.

7. The system of claim 1, wherein the one or more processors are further configured to:
   effectuate storage of driver responsiveness information, the driver responsiveness information including one or more of the first driving behavior information, the second driving behavior information, the feedback information, information relating to the provision of the feedback, information relating to the trigger, and/or information relating to the responsiveness of the driver to the feedback; and
   effectuate retrieval of prior driver responsiveness information.

8. The system of claim 7, wherein the one or more processors are further configured to assess the responsiveness of the driver to the feedback based on the prior driver responsiveness information.

9. The system of claim 7, wherein the one or more processors are further configured to select one or more of a display, a speaker, and/or a haptic generator to effectuate the provision of the feedback to the driver, wherein such selection is based on the prior driver responsiveness information.

10. The system of claim 1, wherein the one or more processors comprise a first processor located on or in the vehicle and a second processor remotely located from the vehicle.

11. A method to determine responsiveness of a driver of a vehicle to feedback regarding driving behaviors, the method comprising:
   obtaining first driving behavior information that characterizes operation of the vehicle by the driver;
   determining an occurrence of a trigger based on the first driving behavior information, the trigger indicating a specific driving behavior;
   obtaining feedback information correlating to the specific driving behavior;
   effectuating provision of feedback defined by the feedback information to the driver to prompt the driver to curb the specific driving behavior;
   obtaining second driving behavior information that characterizes operation of the vehicle by the driver during and/or subsequent to the provision of the feedback; and
   assessing responsiveness of the driver to the feedback based on the second driving behavior information, wherein assessing the responsiveness of the driver includes determining whether the driver curbs the specific driving behavior during and/or subsequent to the provision of the feedback.

12. The method of claim 11, wherein output signals conveying one or more of the first driving behavior information and/or the second driving behavior information are generated by a sensor.

13. The method of claim 12, wherein the sensor includes one or more of an image sensor, an audio sensor, a temperature sensor, a humidity sensor, a vehicle speed sensor, a wheel speed sensor, a proximity sensor, a pressure sensor, a seat belt sensor, an accelerometer, a tilt sensor, an inclination sensor, an angular rate sensor, a gyroscope, a geolocation sensor, a magnetometer, a radar detector, a radar sensor, a vibration sensor, a light detection sensor, an ECM sensor, a physiological sensor, a tachograph, and/or a user input device.

14. The method of claim 11, wherein the effectuating provision of the feedback to the driver includes operating one or more of a display, a speaker, and/or a haptic generator.

15. The method of claim 11, further comprising generating a driver responsiveness rating, the driver responsiveness rating characterizing whether the driver curbs the specific driving behavior during and/or subsequent to the provision of the feedback.

16. The method of claim 11, wherein the first driving behavior information and the second driving behavior information include one or more of visual information, audio information, motion information, acceleration information, location information, spatial information, orientation information, tilt information, inclination/declination information, vibration information, time information, vehicle status information, and/or driver status information.

17. The method of claim 11, further comprising:
effectuating storage of driver responsiveness information, the driver responsiveness information including one or more of the first driving behavior information, the second driving behavior information, the feedback information, information relating to the provision of the feedback, information relating to the trigger, and/or information relating to the responsiveness of the driver to the feedback.

18. The method of claim 17, wherein the assessing the responsiveness of the driver to the feedback based on the second driver behavior information takes into account the stored driver responsiveness information.

19. The method of claim 17, further comprising selecting one or more of a display, a speaker, and/or a haptic generator to effectuate the provision of the feedback to the driver, wherein such selection is based on the stored driver responsiveness information.

20. A system configured to determine responsiveness of a driver of a vehicle to feedback regarding driving behaviors, the system comprising:

a first processor located on or in the vehicle, the first processor configured by machine readable instructions to:
  obtain first driving behavior information that characterizes operation of the vehicle by the driver;
  determine an occurrence of a trigger based on the first driving behavior information, the trigger indicating a specific driving behavior;
  obtain feedback information correlating to the specific driving behavior;
  effectuate provision of feedback defined by the feedback information to the driver to prompt the driver to curb the specific driving behavior;
a second processor remotely located from the vehicle, the second processor configured by machine readable instructions to:
  obtain second driving behavior information that characterizes operation of the vehicle by the driver during and/or subsequent to the provision of the feedback; and
  assess responsiveness of the driver to the feedback based on the second driving behavior information, wherein assessing the responsiveness of the driver includes determining whether the driver curbs the specific driving behavior during and/or subsequent to the provision of the feedback; and
a sensor configured to generate output signals conveying one or more of the first driving behavior information and/or the second driving behavior information.

* * * * *